(12) United States Patent
Jeong et al.

(10) Patent No.: US 6,795,443 B1
(45) Date of Patent: Sep. 21, 2004

(54) APPARATUS AND METHOD OF PROVIDING INTERNET PROTOCOL (IP) LEVEL CONNECTIVITY BETWEEN INTERNET ACCESS TERMINALS USING SERVICE GATEWAY

(75) Inventors: Soo Kil Jeong, Taejeon (KR); Hong Beom Jeon, Taejeon (KR); Hyo Seop Jeon, Taejeon (KR)

(73) Assignee: Korea Telecommunication Authority, Kyunggi-do (KR)

( * ) Notice: Subject to any disclaimer, the term of this patent is extended or adjusted under 35 U.S.C. 154(b) by 0 days.

(21) Appl. No.: 09/435,262

(22) Filed: Nov. 5, 1999

(30) Foreign Application Priority Data

Nov. 10, 1998 (KR) ............................................. 98-48035

(51) Int. Cl.⁷ ............................................. H04L 12/54
(52) U.S. Cl. .................. 370/395.5; 370/356; 370/395.2
(58) Field of Search .......................... 370/395.1, 395.5, 370/395.52, 395.31, 356; 713/153, 170, 182; 709/227, 229, 249

(56) References Cited

U.S. PATENT DOCUMENTS

| | | | | |
|---|---|---|---|---|
| 6,026,441 | A | * | 2/2000 | Ronen .......................... 709/227 |
| 6,327,267 | B1 | * | 12/2001 | Valentine et al. ............. 370/466 |
| 6,345,051 | B1 | * | 2/2002 | Gupta et al. ................ 370/395.2 |
| 6,373,835 | B1 | * | 4/2002 | Ng et al. ...................... 370/352 |
| 6,396,830 | B2 | * | 5/2002 | Aravamudan et al. ........ 370/356 |
| 6,400,719 | B1 | * | 6/2002 | Chimura et al. ........... 370/395.31 |
| 6,421,339 | B1 | * | 7/2002 | Thomas ........................ 370/352 |
| 6,427,170 | B1 | * | 7/2002 | Sitaraman et al. ............ 709/226 |
| 6,535,507 | B1 | * | 3/2003 | Li et al. ........................ 370/356 |

FOREIGN PATENT DOCUMENTS

KR    1019980019456    6/1998

* cited by examiner

*Primary Examiner*—Frank Duong
*Assistant Examiner*—Melanie Jagannathan
(74) *Attorney, Agent, or Firm*—Merchant & Gould, P.C.

(57) ABSTRACT

Disclosed is an apparatus for establishing an IP level connectivity between internet access terminals using a service gateway including a first ISP network connected at one end thereof to a first terminal having an inherent IP address and at the other end thereof to an internet network, the first ISP network including a service gateway for executing authentication of a subscriber of the first terminal in accordance with a service request of the first terminal and communication with other service gateway; a second ISP network connected at one end thereof to the internet network and at the other end thereof to an ATM network to which a second terminal having no inherent IP address is connected, the second ISP network serving to establish an IP level connectivity between the first and second terminals if the first terminal requests connection to the internet network for service use along with the second terminal. The present invention also proposes a service providing method which includes a service providing procedure for establishing an IP level connectivity between a terminal connected to an internet and a dial-up terminal not connected to the internet while also having no inherent IP address.

14 Claims, 13 Drawing Sheets

APPARATUS AND METHOD OF PROVIDING INTERNET PROTOCOL (IP) LEVEL CONNECTIVITY BETWEEN INTERNET ACCESS TERMINALS USING SERVICE GATEWAY

BACKGROUND OF THE INVENTION

1. Field of the Invention

The present invention relates to an apparatus and method for providing an internet protocol (IP) level connectivity between internet access terminals using a service gateway, and more particularly to an apparatus and method which enables a subscriber terminal connected to an internet while having an inherent Internet Protocol (hereinbelow, referred to as "IP") address to communicate with a dial-up internet access terminal which has been allocated with no inherent IP address by establishing an IP level connectivity at any time.

2. Description of the Related Art

Currently, due to the rapid growth of the internet and developments of high speed internet access technology based on an Asynchronous Transfer Mode Protocol (hereinbelow, referred to as "ATM") and Asymmetric Digital Subscriber Line Mode Protocol (hereinbelow, referred to as "ADSL"), an IP fax through the internet and Internet Telephony (hereinbelow, referred to as "IT") are becoming influential communication services.

Such services require communication environment which always enables to be connected to an opposite subscriber terminal like a Plain Old Telephone Service (hereinbelow, referred to as "POTS") or a dial tone service.

The communication environment can be built when two subscriber terminals are connected to the internet and an IP level connectivity between the terminals is provided.

Namely, under the communication environment in which two subscriber terminals are connected to the internet while each having an inherent IP address, and the establishment of the connection to even an IP hierarchy between the terminals through the internet enables transmission/reception of an IP packet, only mutual identification of the IP address of an opposite subscriber terminal is needed to initiate an IT service.

However, in this case, a terminal (hereinbelow, referred to as a "source terminal") initiating the IT service has been connected to the internet while having an inherent IP address, whereas an opposite terminal (hereinbelow, referred to as a "target terminal") is a dial-up terminal connected to the internet while being dynamically allocated to an IP address from an Internet Service Provider (hereinbelow, referred to as "ISP"), which may have not been connected to the internet.

At this point, establishment of an IP level connectivity between two terminals requires that an ISP providing the target terminal with an internet access service identifies the target terminal, which is followed by establishing a Point-to Point Protocol (hereinbelow, referred to as "PPP") with the target terminal while dynamically allocating it an inherent IP address.

Unfortunately, because such a technology has not been developed yet, to be provided with the IP fax and IT services, etc., it is necessary for both terminals in order to be connected to the internet while each having to be allocated with an IP address.

For reference, the above-mentioned dial-up internet access terminal equipped with an ADSL modem is a terminal which complies with a protocol structure of an Internet Access Server (hereinbelow, referred to as "IAS") and a PPP/ATM.

Generally, the dial-up internet access terminal adapted for connection to the internet using the ADSL modem establishes the PPP session with the ISP while being dynamically allocated the IP address upon originating of a connection to the internet, and returns the allocated IP address to the ISP upon terminating of the connection from the internet.

Accordingly, in a state in which the dial-up terminal is connected to the internet, it possesses an inherent IP address, and a subscriber of the dial-up terminal can utilize a desired service or obtain necessary information through the internet.

In case of the connection of such a conventional dial-up internet access terminal to the internet, the subscriber of the dial-up terminal establishes a PPP session with the ISP while being dynamically allocated an IP address from the ISP, only if desired, for a connection to the internet.

Meanwhile, in case that a subscriber of a source terminal connected to the internet wants to utilize a service such as the IT together with a subscriber of a target terminal, if the target terminal is a dial-up terminal which has not been connected to the internet, the service between the source and target terminal cannot be executed.

There is therefore a need in the art for a technology that allows one internet terminal allocated with an IP address to call the other internet terminal allocated with no IP address, thereby providing both internet terminals with any internet service.

SUMMARY OF THE INVENTION

Therefore, the present invention has been made in view of the above-mentioned problems, and it is an object of the present invention to provide an apparatus and method which enables a subscriber terminal connected to an internet while having an inherent IP address to communicate with a dial-up internet access terminal which has been allocated with no inherent IP address by establishing an IP level connectivity at any-time.

In an aspect of the present invention, there is provided an apparatus for providing an IP level connectivity between internet access terminals using a service gateway comprising: a first ISP network connected at one end thereof to a first terminal having an inherent IP address and at the other end thereof to an internet network, the first ISP network including a service gateway for executing authentication of a subscriber of the first terminal in accordance with a service request of the first terminal and communication with other service gateway; and a second ISP network connected at one end thereof to the internet network and at the other end thereof to an ATM network to which a second terminal having no inherent IP address is connected, the second ISP network serving to establish an IP level connectivity between the first and second terminals if the first terminal requests a connection to the internet network for service use along with the second terminal.

In another aspect of the present invention, there is also provided a method for providing an IP level connectivity between internet access terminals using a service gateway, comprising the steps of: establishing a first service gateway for executing authentication of a subscriber of a first terminal allocated with an inherent IP address and for allowing the first terminal to communicate with a second terminal by a request of the first terminal; establishing a second service gateway for executing authentication of a subscriber of the second terminal allocated with no inherent IP address and for allowing the first terminal to communicate with the second terminal by a request of the first terminal; requesting an assignment of the inherent IP address to be allocated to the second terminal if the second service gateway receives a request message for a connection between the first and second terminals from the first service gateway; and allocating the IP address requested in the requesting step to the second terminal, and transmitting the result of a connection of the second terminal to the internet network to the first terminal if the second terminal is connected to the internet network.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Reference will now be made in detail to the preferred embodiments of the present invention. In the following description of the present invention, a detailed description of known functions and configurations incorporated herein will be omitted when it makes the subject matter of the present invention rather unclear.

Prior to the description of the present invention, terminologies used herein will be defined hereinbelow as follows:

A Dial-up terminal or an internet terminal means a terminal which is adapted to establish a PPP session with an IAS of an ISP network through an ADSL modem while being dynamically allocated the IP address by the IAS for connection to an internet. The dial-up terminal may be a conventional personal computer (PC).

A protocol structure between the dial-up terminal and the IAS complies with a PPP/ATM.

ISP means a telecommunication business enterprise which provides the dial-up terminal with an internet access service by dynamically allocating the IP address to the dial-up terminal through the IAS. The ISP usually connects not only to the Internet through its server IAS and router interface, but also to a switching system in a telephone network; to provide dial-up service to user terminals connected to the telephone network.

IAS means an internet access server operated by the ISP, which has the functions of a PPP server and an IP router for executing dynamical allocation of an IP address to terminals and a routing function of an IP packet.

Establishment or provision of an IP connectivity between terminals means that each of two terminals has been connected to the internet while having an inherent IP address, the IP packet routing functions of the IAS and an IP router deployed in an internet network and an ISP network allow transmission/receipt of the IP packet between two terminals.

Figure 1:
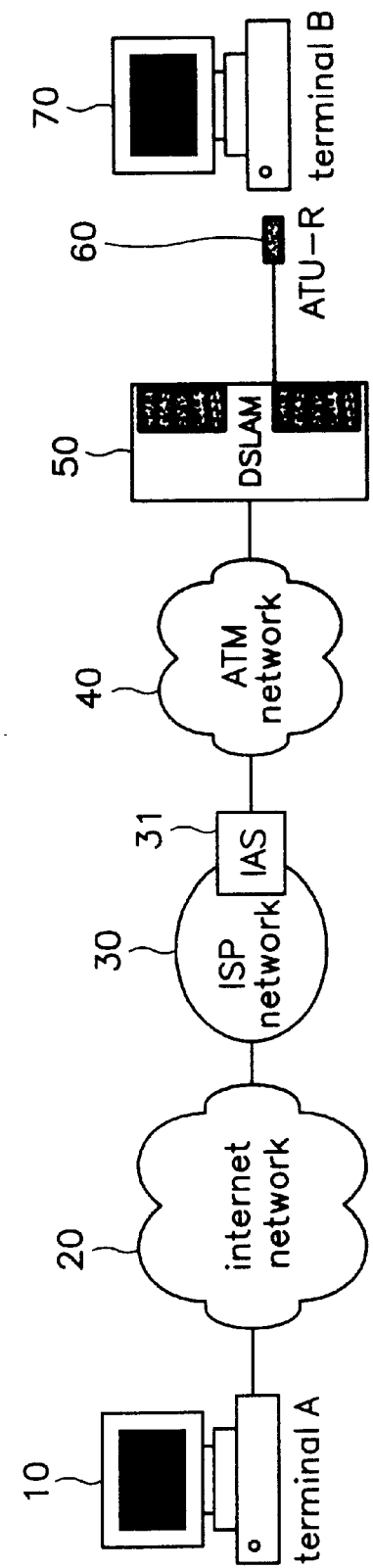
FIG. 1 is a schematic network diagram illustrating a network architecture suitable for use with the principle of the present invention.

FIG. 1 is a schematic network diagram illustrating communication environment and a network architecture suitable for use with the apparatus of the present invention.

Referring to FIG. 1, the network architecture comprises a source terminal A 10, a target terminal B 70, a Digital Subscriber Line Access Multiplexer (hereinbelow, referred to as "DSLAM") 50, and an ADSL Transceiver Unit Remote (hereinbelow, referred to as "ATU-R") 60.

The source terminal A 10 is directly connected to the internet network 20 while having an inherent IP address.

The target terminal B 70 is a dial-up terminal, which serves to establish a Virtual Channel (hereinbelow, referred to as "VC") of an ATM network 40 and a PPP session with the IAS 31 positioned in a Point of Presence (hereinbelow, referred to as "PoP") of the ISP network 30 while being dynamically allocated with an IP address by the IAS 31 for connection to the internet network 20.

The DSLAM 50 acts to perform multiplexing/demultiplexing functions of the ATM VC as well as terminate an ADSL signal between the internet network 20 and the target terminal 70.

The ATU-R 60 is adapted to form an ADSL loop between the DSLAM 50 and the target terminal B 70, which is an ADSL modem of a subscriber side.

In connection with such a communication environment, in the present invention, it is considered that the target terminal B 70 is allocated with an IP address by the ISP 30 while having an inherent IP address when a dial-up terminal like the target terminal B 70 is connected to the internet network, but when the target terminal B 70 is not connected to the internet network, it is considered that the target terminal B 70 is allocated with no IP address.

Also, communication protocol between the target terminal B 70 and the IAS 30 complies with PPP/ATM protocol, and the use of signaling protocol of an ATM User Network Interface (hereinbelow, referred to as "UNI") establishes the ATM VC. Further, it is assumed that the target terminal B 70 is in a power-on state and can receive a setup message of the signaling protocol.

In such communication environment as shown in FIG. 1, for a subscriber of the source terminal A 10 to initiate a service like IT together with a subscriber of the source terminal B 70, it is necessary for an IP level connectivity be established between the IAS 31 and the target terminal B 70.

At this point, establishment of an IP level connectivity between the IAS 31 and the target terminal B 70 means that the target terminal B 70 is connected to the internet network while being allocated with an IP address by the IAS 31, and that if the IAS 31 initiates a routing of IP packet directing toward the target terminal B 70 thereto, the IP packet is transferred to the target terminal B 70. For the purpose of this, first of all, the ATM VC and the PPP session should be established between the IAS 31 and the target terminal B 70.

Figure 2:
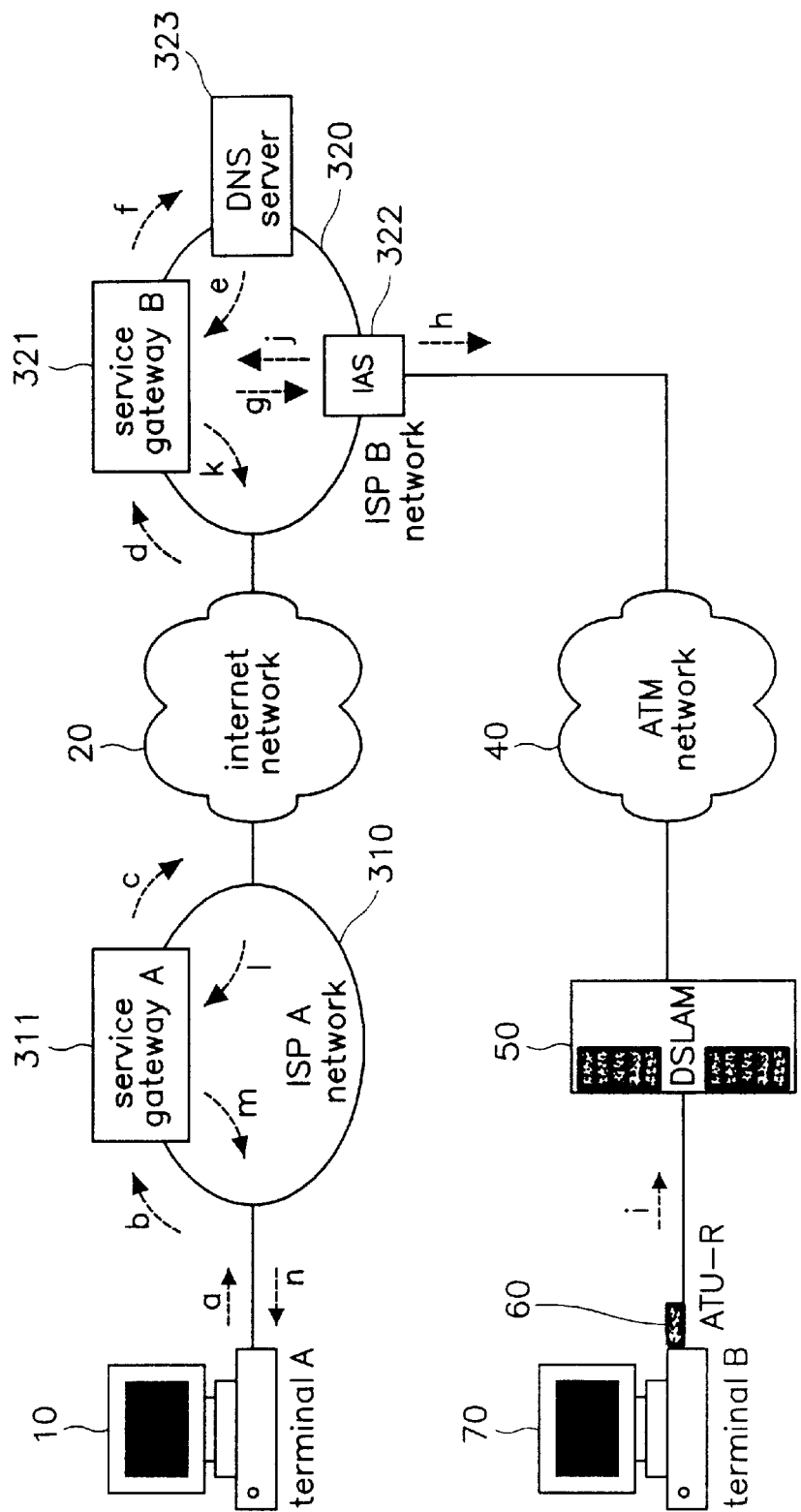
FIG. 2 is a network diagram illustrating a service providing procedure including the representation of a flow of signals for establishment of an IP level connectivity between two internet access terminals according to an embodiment of the present invention.

FIG. 2 is a network diagram illustrating a service providing procedure including the representation of a flow of signals to provide an end-to-end IP level connectivity between the source terminal A 10 and the target terminal B 70 according to an embodiment of the present invention in such communication environment as shown in FIG. 1.

In a network environment in which a subscriber of the source terminal A 10 is a subscriber of an ISP B network 320 or can be directly connected to a service gateway B 321 of the ISP B network 320, a procedure in which the source terminal A 10 is connected to a service gateway A 311 of the ISP A network 310 can be omitted.

At this time, each of the service gateways 311 and 321 among the network constituting elements is one of the elements necessary for provision of an IP level connectivity between the terminals, and the detailed description on its function will be followed later.

Describing briefly the service providing procedure, when the source terminal A 10 provides domain names and subscriber information of the source terminal A 10 and the target terminal B 70 for a service gateway, the procedure is initiated, and when the target terminal B 70 is allocated an inherent IP address by the ISP network for connection to the internet network and the IP address or an error message of the target terminal B 70 is redirected to the source terminal A 10, the procedure is terminated.

The function and operation of each of the network constituting elements according to such a service providing procedure will be described in detail hereinafter with reference to FIGS. 3 to 13.

Figure 3:
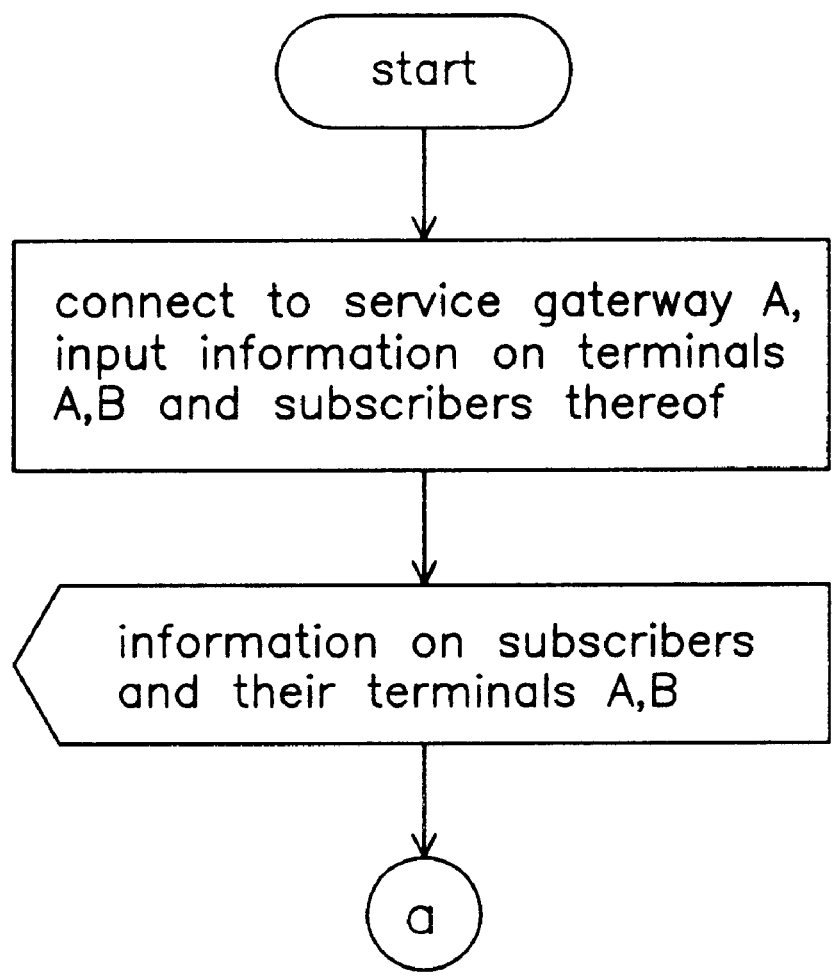
FIG. 3 is a flowchart for explaining the operation of the source terminal A according to the service providing procedure in FIG. 2 of the present invention.
Figure 4:
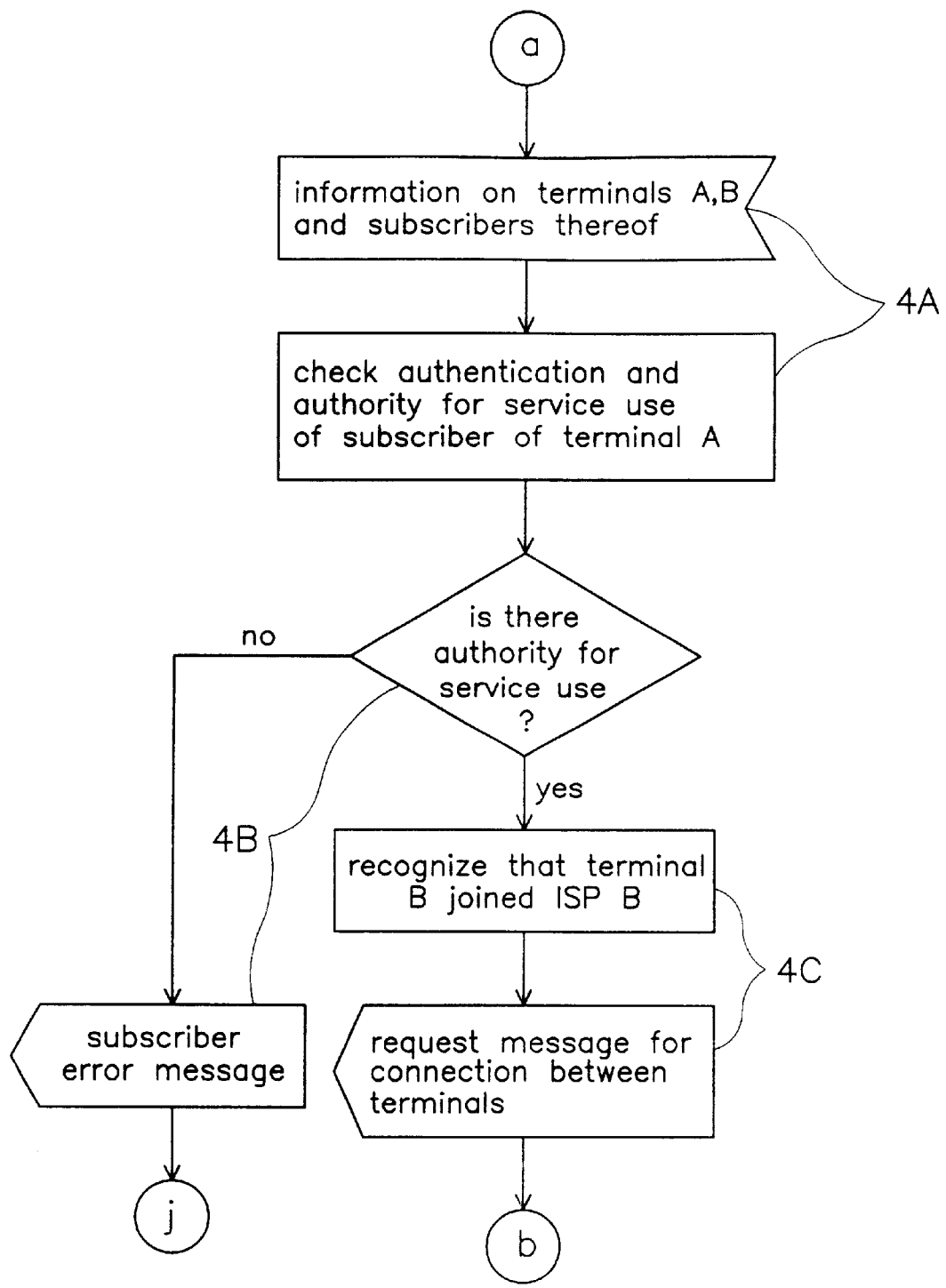
FIG. 4 is a flowchart for explaining the operation of the service gateway A according to the service providing procedure in FIG. 2 of the present invention.
Figure 5:
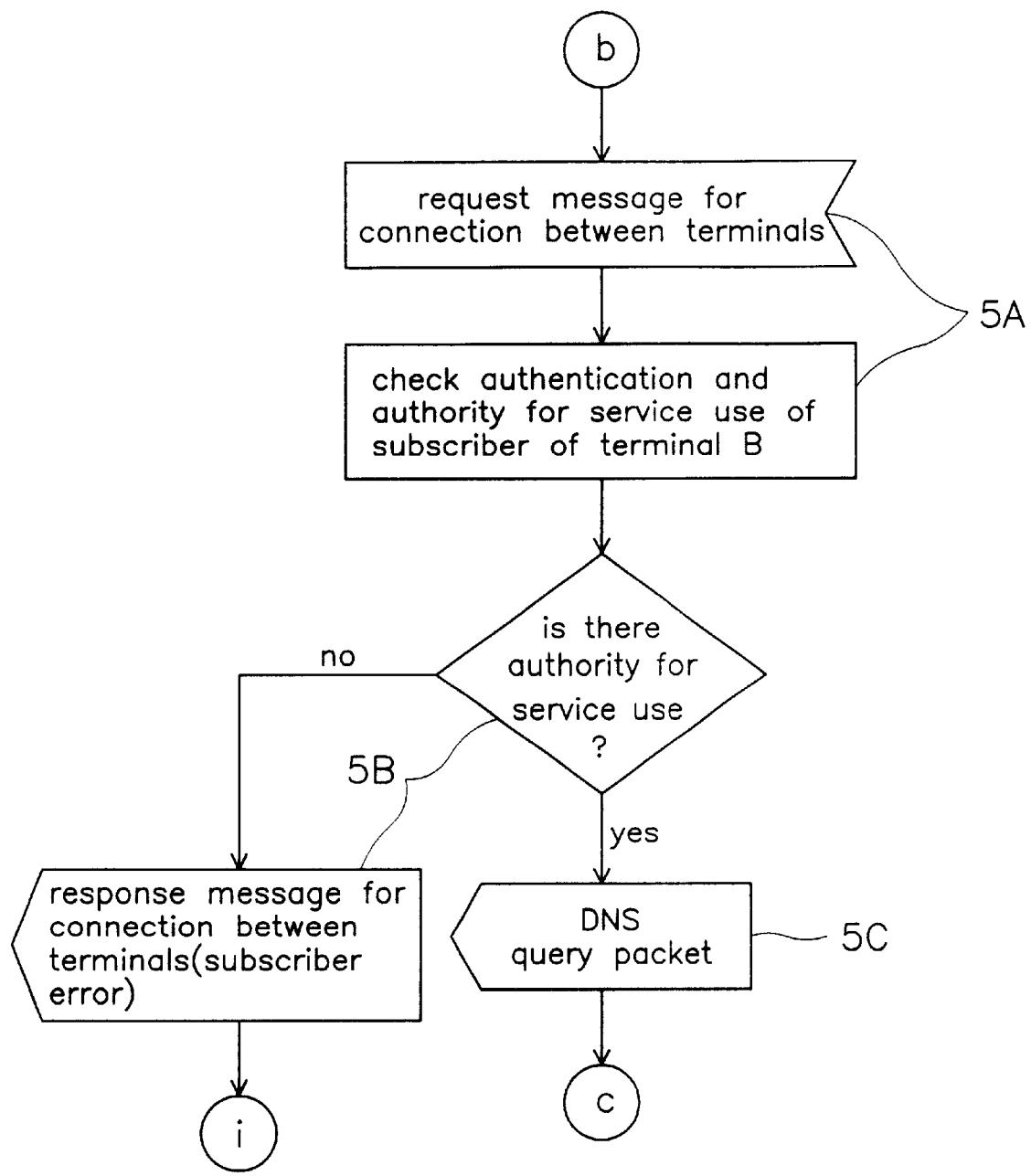
FIG. 5 is a flowchart for explaining the operation of the service gateway B according to the service providing procedure in FIG. 2 of the present invention.
Figure 6:
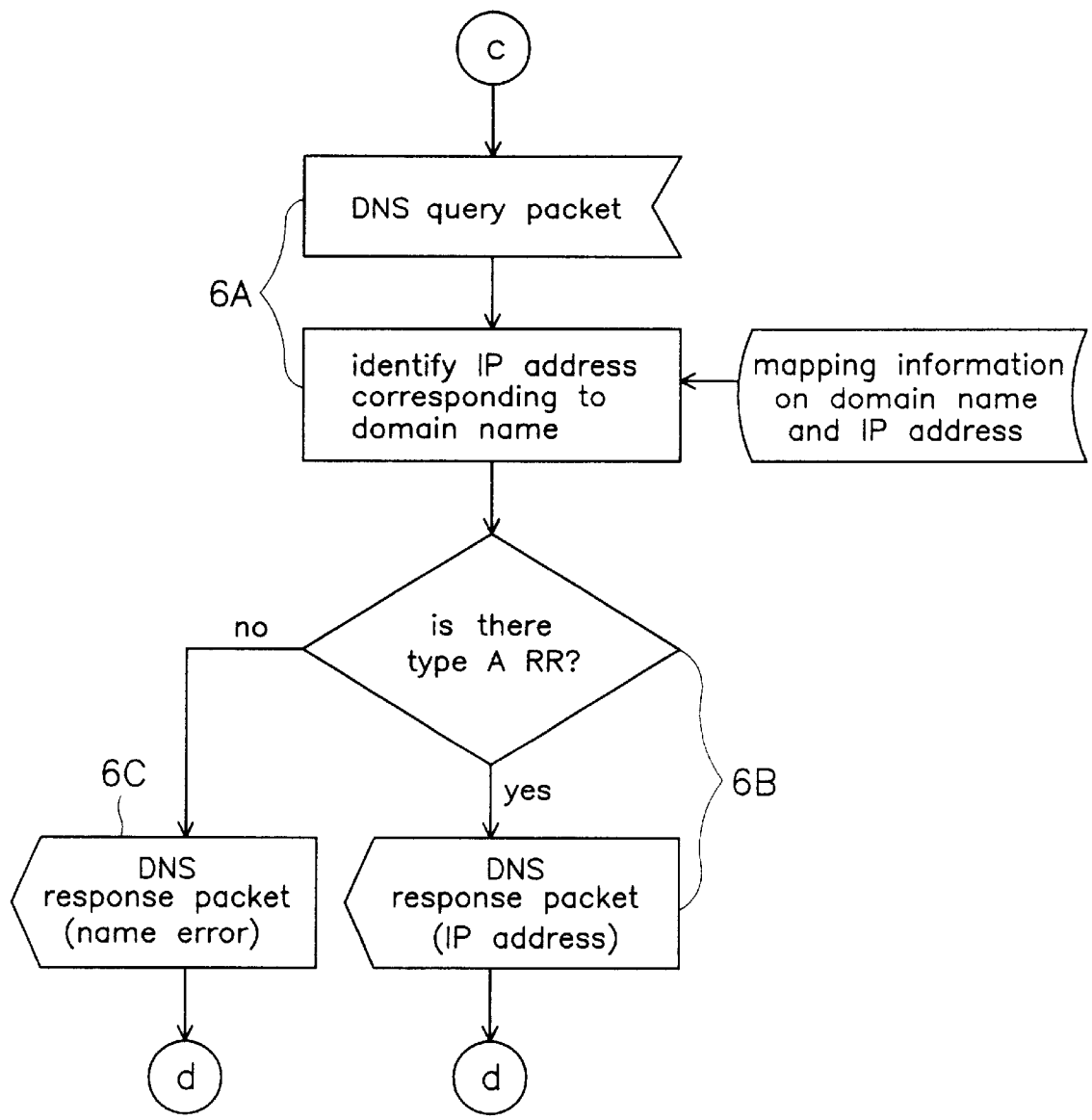
FIG. 6 is a flowchart for explaining the operation of a DNS server according to the service providing procedure in FIG. 2 of the present invention.
Figure 10:
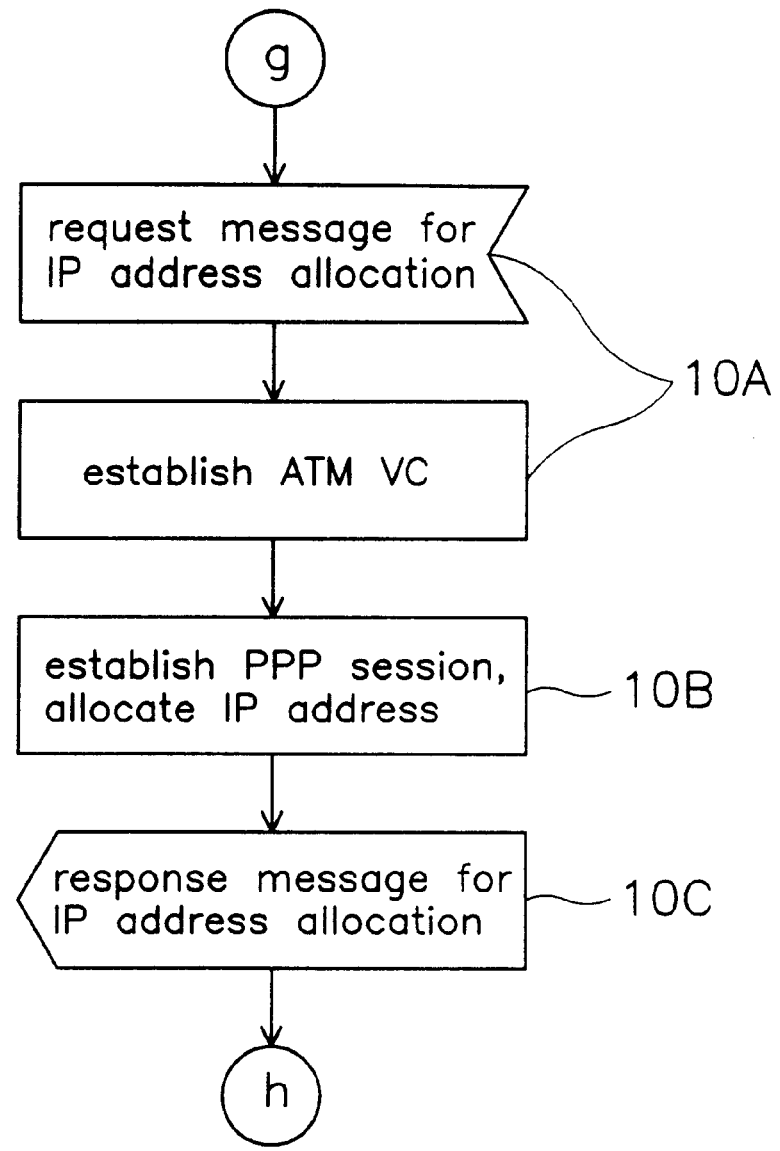
FIG. 10 is a flowchart for explaining the operation of an IAS according to the service providing procedure in FIG. 2 of the present invention.
Figure 11:
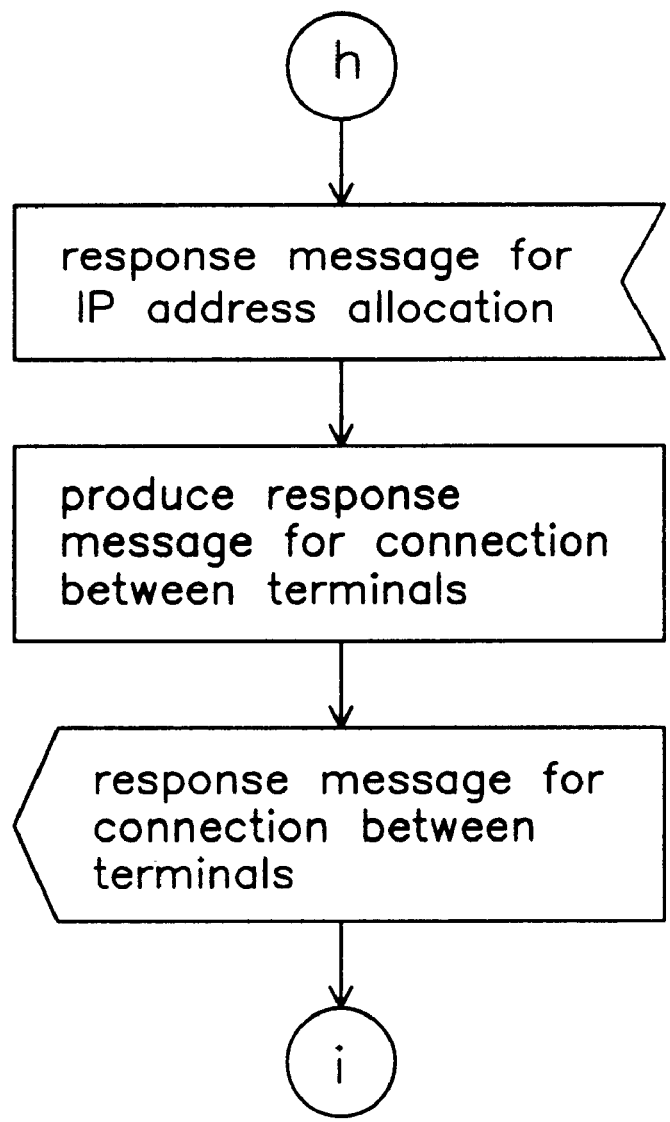
FIG. 11 is a flowchart for explaining the operation of the service gateway B according to the service providing procedure in FIG. 2 of the present invention.
Figure 12:
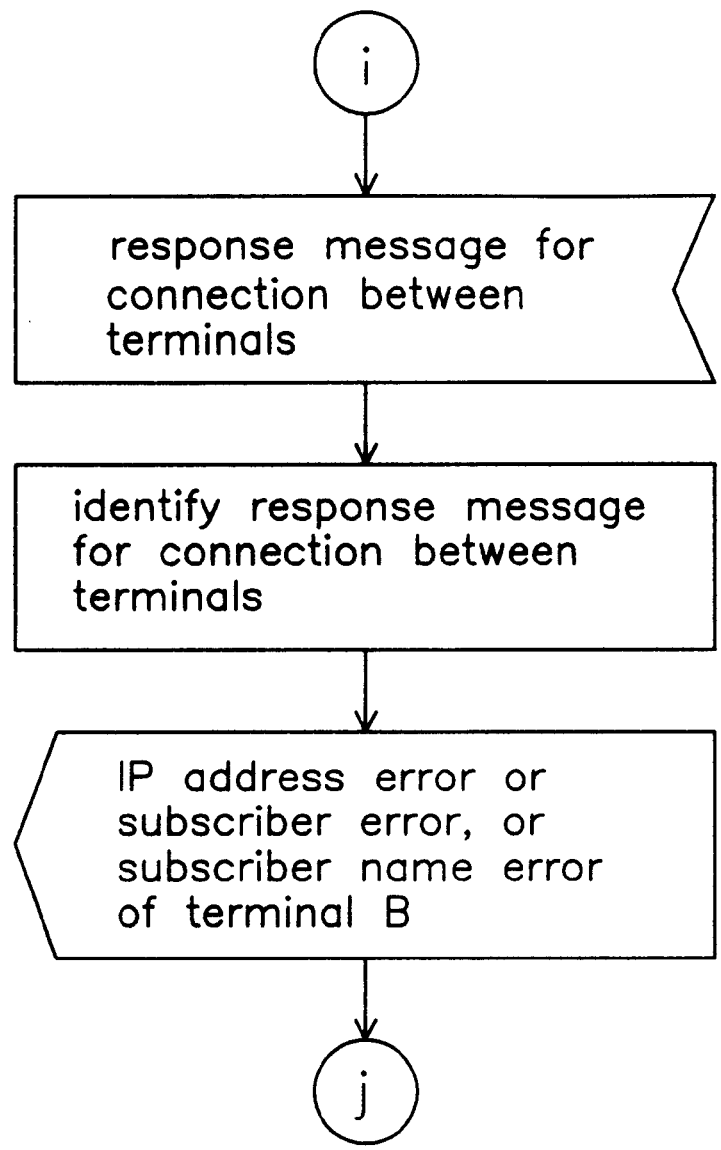
FIG. 12 is a flowchart for explaining the operation of the service gateway A according to the service providing procedure in FIG. 2 of the present invention.
Figure 13:
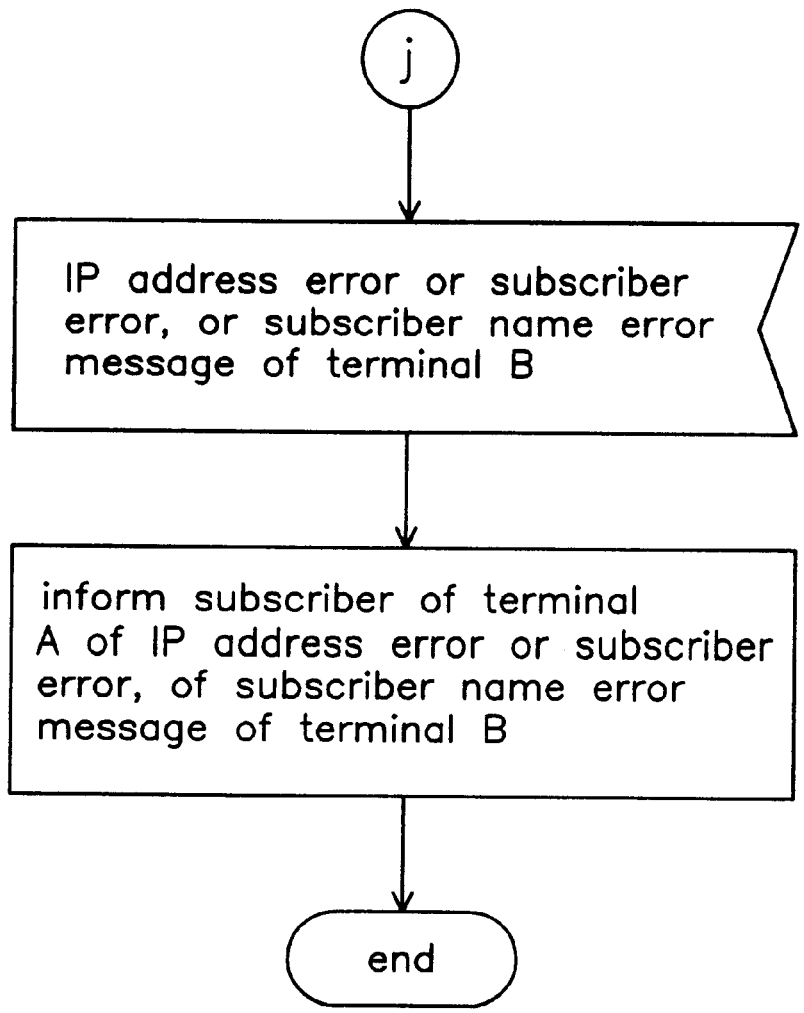
FIG. 13 is a flowchart for explaining the operation of the source terminal A according to the service providing procedure in FIG. 2 of the present invention.

Referring to the drawings, FIGS. 3 and 13 illustrate a flowchart of the operation of the source terminal A in FIG. 2 upon initiating of the service providing procedure in which an IP level connectivity is established between the source and target terminals A and B according to the present invention. Also, FIGS. 4 and 12 illustrate a flowchart of the operation of the service gateway A according to the service providing procedure in FIG. 2, and FIGS. 5, 7, 9 and 11 illustrate a flowchart of the operation of the service gateway B according to the service providing procedure in FIG. 2. FIGS. 6 and 8 illustrate a flowchart of the operation of a Domain Name System (hereinbelow, referred to as "DNS") server according to the service providing procedure in FIG. 2, and FIG. 10 illustrate a flowchart of the operation of an IAS of an ISP network according to the service providing procedure in FIG. 2, respectively.

In addition, symbols (a) to (j) designate a connection relation between the flowcharts of the drawings.

Referring now to the flow charts of FIGS. 3 to 13 along with FIG. 2, the operation of the service-providing procedure of the invention will now be described.

A subscriber of a source terminal A connects to a service gateway A 311 to select a desired service, and provides the service gateway A 311 with information on the subscribers own self and the source terminal A as well as information on a subscriber of a target terminal B 70 and the target terminal B 70 (procedure "a" and "b" in FIG. 2 and process step in FIG. 3 in detail). At this time, the subscriber of the source terminal A can be connected to a homepage operated by the service gateway A 311 through a web browser (not shown). A service which the subscriber can select may comprise services requesting a connection such as an IP fax and an IT. Information on the subscriber and the terminal which the subscriber of the terminal A provides for the service gateway A 311 includes the subscriber of the source terminal A and the subscriber name thereof, a password, the subscriber name of the source terminal B, and domain names of the source and target terminal A and B.

Subsequently, referring to FIG. 4, the service gateway A 311 checks authentication of the subscriber of the terminal A and if the terminal A has authority for the service use by referring to a subscriber name and a password of the source terminal A (step 4A). When there is no authority for service use, the service gateway A 311 transfers a subscriber error message to the source terminal A 10 (step 4B) and the program proceeds with a process routine (see FIG. 13) for processing the subscriber error message (procedure "m" in FIG. 2). At this point, the subscriber error message represents that the subscriber of the terminal A is not legal, or is legal but has no authority for the service use.

If it is determined at step 4A that there is authority for the service use, the program proceeds to step 4C where the service gateway A 311 recognizes that the target terminal B 70 joins an ISP B 320 and transfers a request message for a connection between the terminals A and B to a service gateway B 321 (procedure "c" in FIG. 2).

At this time, the request message for a connection includes a domain name and a subscriber name of the target terminal B 70.

At subsequent step 5A (see FIG. 5), the request message for a connection between the terminal A and B is transferred to the service gateway B 321 through the internet network (procedure "d" in FIG. 2). The service gateway B 321 checks authentication of the subscriber of the terminal B and if the terminal B has authority for service use by referring to the domain name and the subscriber name of the target terminal B 70. When there is no authority for service use, the service gateway B 321 informs the service gateway A 311 of an error of the subscriber of the terminal B through a response message for a connection between the terminals A and B (step 5B) and the program proceeds with a process routine (see FIG. 12) for processing the subscriber error message (procedure "k" in FIG. 2). On the other hand, if it is determined at step 5A that there is authority for the service use, the program proceeds to step 5C where the service gateway B 321 sends a DNS query packet to a DNS server 323 (procedure "f" in FIG. 2). The DNS query packet is a request for an IP address corresponding to a domain name of the target terminal B 70. The DNS query packet includes an OPCODE field filled with "QUERY", a QNAME field filled with a domain name of the terminal B, a QCLASS field filled with "IN" indicative of an internet class, and a QTYPE field filled with "A" indicative of an IP address.

Referring now to FIG. 6, when the DNS query packet is transferred to the DNS server 323 by the service gateway B 321, the DNS server 323 identifies whether or not there exists a type A Resource Record (hereinbelow, referred to as "RR") corresponding to a domain name of the target terminal B 70 included in the query packet by referring to database maintained by itself (step 6A). The type A RR is a record for storing a pair of IP addresses corresponding to the domain name of the terminal B 70.

If it is determined at step 6A that there is the type A PR, the DNS server 323 returns the IP address of the target terminal B 70 to the service gateway B 321 through a DNS response packet (procedure "e" in FIG. 2, step 6B). On the other hand, if it is determined at step 6A that there is not the type A RR, the DNS server 323 returns a name error of the target terminal B 70 to the service gateway B 321 through a DNS response packet (procedure "e" in FIG. 2, step 6C). The name error means that there is not the type A RR corresponding to the domain name of the target terminal B 70.

Figure 7:
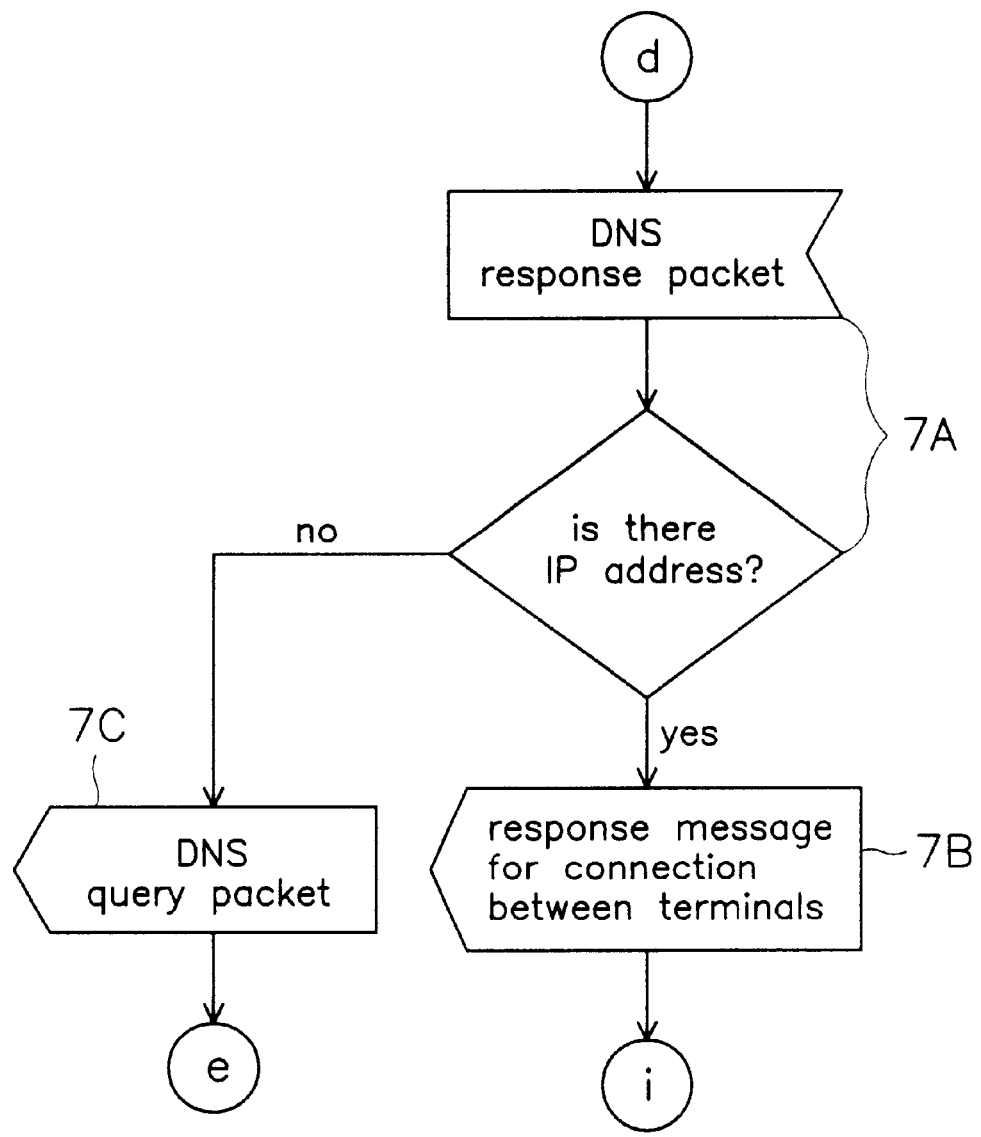
FIG. 7 is a flowchart for explaining the operation of the service gateway B according to the service providing procedure in FIG. 2 of the present invention.
Figure 8:
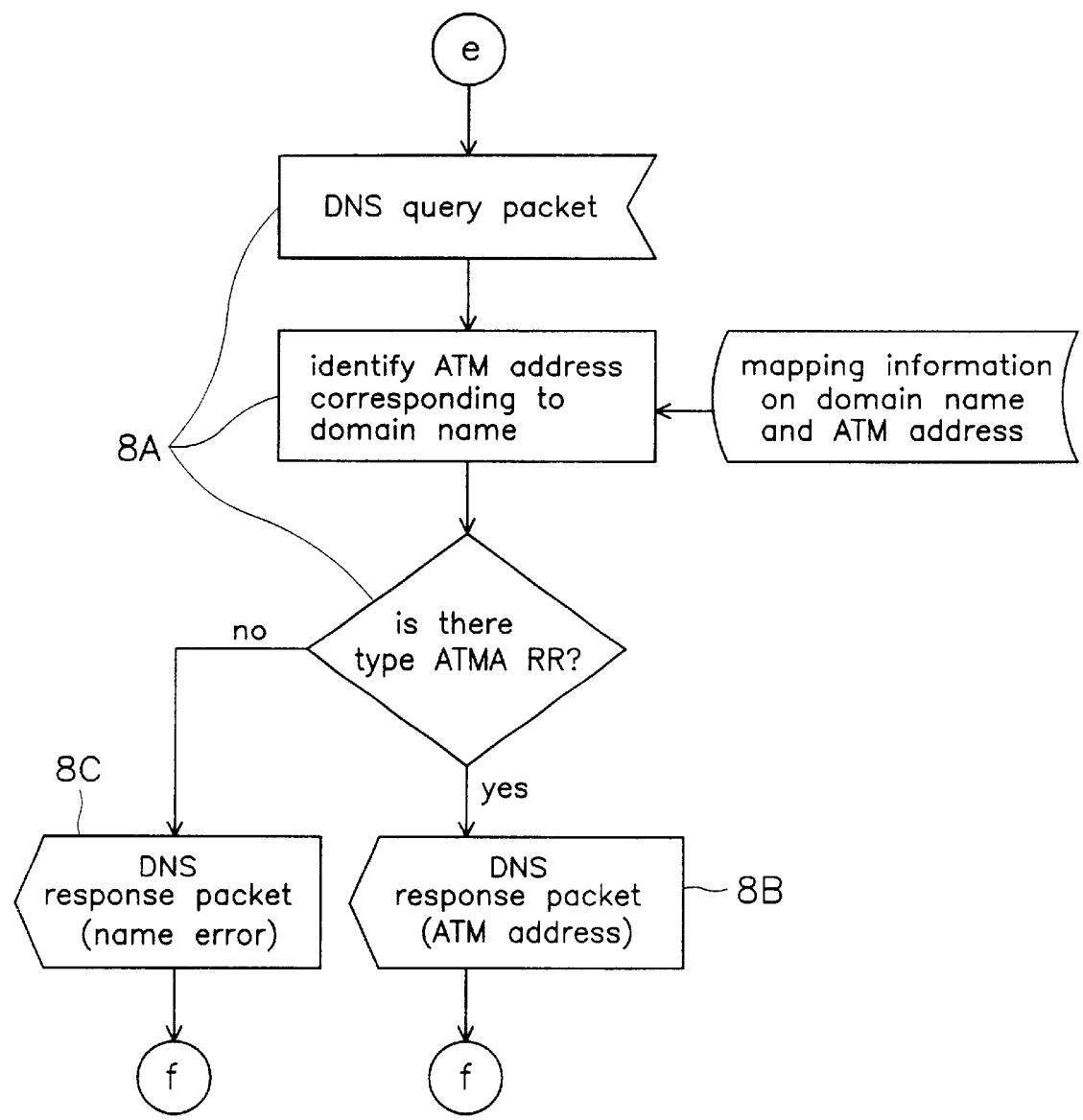
FIG. 8 is a flowchart for explaining the operation of a DNS server according to the service providing procedure in FIG. 2 of the present invention.

Next, referring to the flowchart of FIG. 7, when the DNS response packet is transferred to the service gateway B 321 by the DNS server 323, the service gateway B 321 checks if there is the IP address of the target terminal B70 in the DNS response packet (step 7A). If it is checked that there is the IP address of the target terminal B70, the service gateway B 321 generates a response message for connection between the source and target terminals A 10 and B 70 for transmission to the service gateway A 311, and the program proceeds to a process routine (see FIG. 12) for processing the connection response message (procedure "k" in FIG. 2 and step 7B). At this point, the response message for connection between the source and target terminals A 10 and B 70 includes a subscriber name, a domain name and an IP address of the target terminal B 70.

On the other hand, If it is checked at step 7A that there is a name error of the target terminal B70 in the DNS response packet, the service gateway B 321 return the DNS query packet to the DNS server 323 (procedure "f" in FIG. 2 and step 7C).

At this time, the DNS query packet is a request for an ATM address corresponding to a domain name of the target terminal B 70. That is, the DNS query packet includes an OPCODE field filled with "QUERY", a QNAME field filled with a domain name of the terminal B, a QCLASS field filled with "IN" indicative of an internet class, and a QTYPE field filled with "ATMA" indicative of an ATM address.

Subsequently, referring to the flowchart of FIG. 8, when the DNS query packet is transferred to the DNS server 323 by the service gateway B 321, the DNS server 323 identifies whether or not there exists a type ATMA RR corresponding to a domain name of the target terminal B 70 included in the query packet by referring to database maintained by itself (step 8A). The type ATMA RR is a record for storing a pair of ATM addresses corresponding to the domain name of the terminal B 70.

If it is determined at step 8A that there is the type ATMA RR, the DNS server 323 returns the ATM address of the target terminal B 70 to the service gateway B 321 through a DNS response packet (procedure "e" in FIG. 2, step 8B). On the other hand, If it is determined at step 8A that there is not the type ATMA RR, the DNS server 323 returns a name error of the target terminal B 70 to the service gateway B 321 through a DNS response packet (procedure "e" in FIG. 2, step 8C). The name error means that there is not the type ATM RR corresponding to the domain name of the target terminal B 70.

Figure 9:
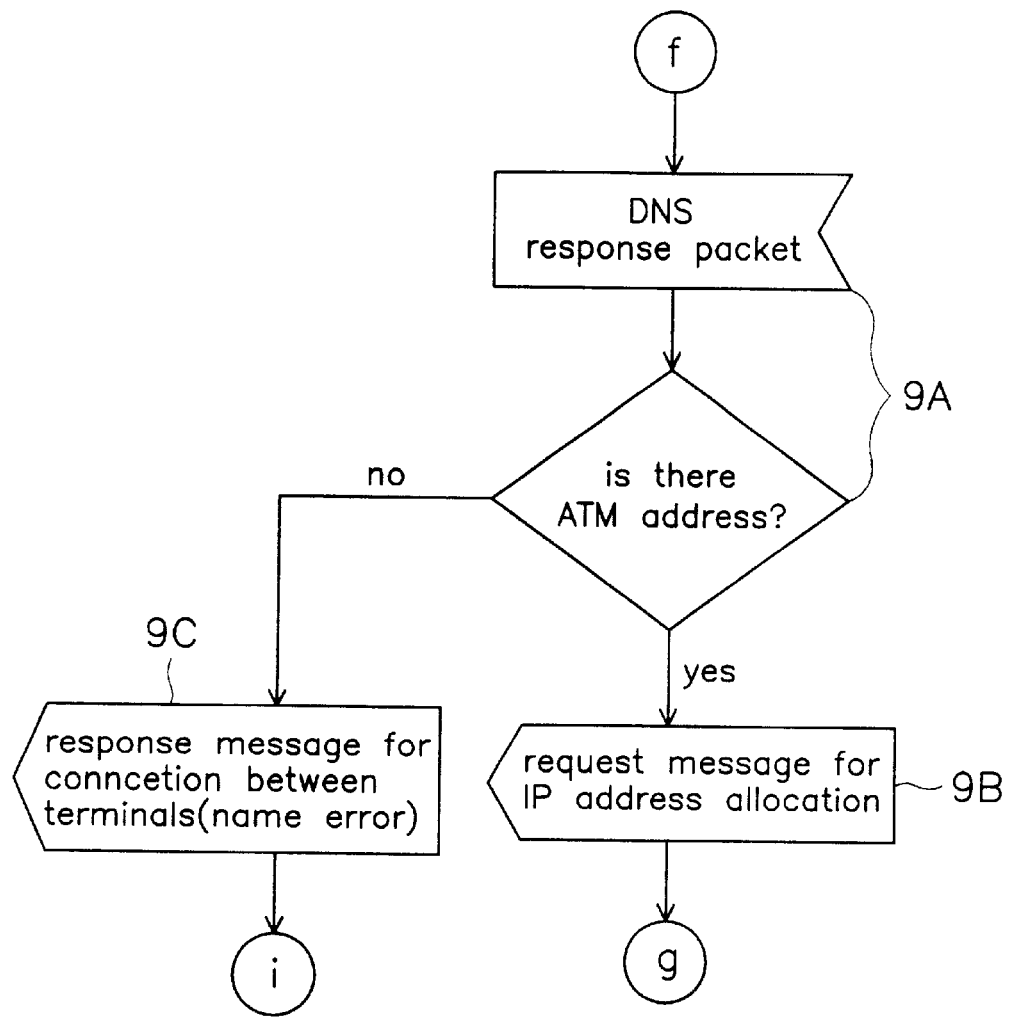
FIG. 9 is a flowchart for explaining the operation of the service gateway B according to the service providing procedure in FIG. 2 of the present invention.

Consequently, referring to the flowchart of FIG. 9, when the DNS response packet is transferred to the service gateway B 321 by the DNS server 323, the service gateway B 321 checks if there is the ATM address of the target terminal B70 in the DNS response packet (step 9A). If it is checked that there is the ATM address of the target terminal B70, the service gateway B 321 transfers a request message for allocation of an IP address to an IAS 322 (procedure "g" in FIG. 2 and step 9B). At this point, the request message for IP address allocation includes a domain name and an ATM address of the target terminal B 70.

On the other hand, if it is checked at step 9A that there is a name error of the target terminal B70 in the DNS response packet, the service gateway B 321 informs the service gateway 311 of the name error through a response message for connection between the source and target terminals A 10 and B 70, and the program proceeds to a process routine (see FIG. 12) for processing the connection response message (procedure "k" in FIG. 2 and step 9C).

Referring now to the process routine of FIG. 10, when the IAS 322 receives the request message for IP address allocation from the service gateway B 321, it transmits a set-up message of ATM UNI signaling protocol to the target terminal B 70 and establishes an ATM VC along with the target terminal B 70 (procedure "h" in FIG. 2 and step 10A). And then, The IAS 322 establishes a PPP session and allocates an IP address to the target terminal B 70 (procedure "i" in FIG. 2 and step 10B). At this point, either the IAS 322 or the target terminal B 70 can initiate PPP Link Control Protocol (hereinbelow, referred to as "LCP") for establishing the PPP session.

The IAS 322 transmits the IP address allocated to the target terminal B 70 to the service gateway B 321 through a response message for IP address allocation (procedure "j" in FIG. 2 and step 10C). At this point, the response message of IP address allocation includes a domain name and an IP address of the target terminal B 70.

Subsequently, referring to the process routine of FIG. 11, when the service gateway B 321 receives the response message of IP address allocation from the IAS 322, it returns a subscriber name, a domain name and an IP address of the target terminal B 70 to the service gateway A 311 through a response message for connection between the source and target terminals A 10 and B 70 (procedure "k" in FIG. 2).

Next, referring to the process routine of FIG. 12, when the service gateway A 311 receives the response message for connection between the source and target terminals, it returns the IP address error or a subscriber error, or a subscriber name error of the target terminal B 70 to the source terminal A10 (procedures "l" and "m" in FIG. 2).

Last, referring to the process routine of FIG. 13, the source terminal A 10 informs a subscriber of an IP address error or a subscriber error, or a subscriber name error of the target terminal B 70 by displaying any one of the IP address error, a subscriber error, and a subscriber name error of the target terminal B 70 (procedures "l" and "m" in FIG. 2).

Meanwhile, in order to support the above-mentioned service providing procedures, it is necessary that network constituting elements have further required particulars of functions to be added or modified to or from conventional functions thereof.

First, the DNS server 323 has the following functions:
(a) A Storage Function of a Type ATMA RR for Identification of a Dial-up Terminal A terminal identifier is required for a service gateway to identify a dial-up terminal, such as the target terminal B 70, which is not been connected to an internet network when a service gateway receives a request message for connection between source and target terminals.

Either an IP address or a domain name of a terminal can be used as the terminal identifier, but for a dial-up terminal allocated with no ID address, a domain name thereof can be used as the terminal identifier. However, because a conventional DNS server stores a pair of a domain name and an IP address, a dial-up terminal allocated with no ID address does not have a type A RR and does not have the domain name stored therein.

On the other hand, because a DNS server 323 adapted for use with the present invention also has a storage function of a type ATMA RR, i.e. a record for storing a domain name and a pair of ATM addresses defined in an ATM Name System (hereinbelow, referred to as "ANS") of ATM forum in addition to a storage function of a type A RR, it uses a domain name of a terminal as a terminal identifier. That is, the DNS server 323 always stores the type ATMA RR of a dial-up terminal having an ATM address, such as the terminal B 70, in a database of its own self, thereby maintaining a domain name irrespective of IP address allocation to a terminal.

If the target terminal B 70 has not been connected to the internet network, only ATMA RR is stored in the DNS server 323. Thus, after the target terminal B 70 is allocated with an IP address, a type A RR is added to the D.S. server 323. The DNS server 323 should store both a type A RR which a conventional DNS server has and a type ATMA RR. At this time, a TTL field is filled with "0". The intention for this is to prevent a DNS settler of a terminal or other DNS servers from cashing the type A RR and the type ATMA RR of a dial-up terminal such as target terminal B 70.

(b) The Operation of a DNS Server

When the DNS server receives a DNS query packet including an OPCODE field filled with "QUERY", a QNAME field filled with a domain name of the terminal B, a QCLASS field filled with "IN" indicative of an internet class, and a QTYPE field filled with "A" indicative of an IP address, it produces a DNS response packet, and then turns it to a service gateway of an ISP network to which the DNS server belongs by referring to database of its own like a conventional DNS server (see FIG. 6).

If the received DNS query packet includes an OPCODE field filled with "QUERY", a QNAME field filled with a domain name of the terminal B, a QCLASS field filled with "IN" indicative of an internet class, and a QTYPE field filled with "ATMA" indicative of an ATM address, the DNS server produces a DNS response packet, and then turns it to a service gateway of an ISP network to which the DNS server belongs by referring to database of its own self.

Secondly, a service gateway has the following functions:

(a) Authentication of a Subscriber

The service gateway should check if a subscriber of the source terminal A has authority to use a service which the subscriber requested by referring to subscriber information which the subscriber of the source terminal A provides for the service gateway. Namely, if a specified subscriber requested an IT service, the service gateway should check authentication of the specified subscriber and authority for service use through a name of the subscriber to identify if the specified subscriber is joined to an ISP and has authority to use the IT service.

(b) The Operation of Service Gateway

The service gateway A 311 serves to check authentication of a subscriber and authority for service use of the source terminal A 10 by referring to the subscriber name and a password of the source terminal A 10. If it is checked that there is no authority for the service use, the service gateway A 311 transmits a subscriber error message to the source terminal A 10. On the other hand, if it is checked that there is authority for the service use, the service gateway A 311 recognizes that the target terminal B 70 has been joined to ISP B 320 and transmits a request message for connection between the source and target terminals A and B to a service gateway B 321. At this time, when the service gateway A 311 receives a response message for connection between the source and target terminals, it returns an IP address error or a subscriber error, or a subscriber name error of the target terminal B 70 to the source terminal A 10.

When the service gateway B 321 receives the request message for connection between the source and target terminals A and B, it checks authentication and authority for service use of the subscriber of the target terminal B 70. If it is checked that there is no authority for service use, the service gateway B 321 informs the service gateway A 311 of a subscriber error of the target terminal B 70 through the response message for connection between the terminals. On the other hand, if it is checked that there is authority for service use, the service gateway B 321 produces a DNS query packet for transmission to a DNS server 323.

At this time, when the service gateway B 321 receives a DNS response packet, it checks if there is an ID address of the target terminal B 70. If it is checked that there is the ID address, the service gateway B 321 produces a response message of connection between the terminals for transmission to the service gateway B 321. On the other hand, if it is checked that there is a name error of the target terminal B 70, the service gateway B 321 transmits the DNS query packet to the DNS server 323.

Also, when the service gateway B 321 receives a DNS response packet, it checks if there is an ATM address of the target terminal B 70. If it is checked that there is the ATM address, the service gateway B 321 transmits a request message of IP address allocation to the IAS 322. On the other hand, if it is checked that there is a name error of the target terminal B 70 in the DNS response packet, the service gateway B 321 informs the service gateway A 311 of the name error through the response message for connection between the terminals.

When the service gateway B 321 transmits a request message of the IP address allocation to the IAS 322 while receiving the response messages for ID address allocation, it returns a subscriber name, a domain name, and an IP address of the target terminal B 70 to the service gateway A 311 through the response message for connection between the terminal.

Accordingly, the service gateway has a function and operation of the above service gateway A 311 and B 321 simultaneously.

(c) Communication with Other Service Gateways

The service gateway A 311 should identify through a domain name of the target terminal B 70 a domain name of an ISP to which the target terminal B 70 belongs, and the service gateway B 321 belonging to a domain of the ISP. For the purpose of this, the service gateway A 311 should maintain mapping information on a domain name of an ISP and an IP address of a service gateway.

In addition, a request message for connection between the terminals and a response message for connection between the terminals for communication between the service gateways are defined and used. The request message for connection between the terminals includes a domain name and a subscriber name of the target terminal B 70, and the response message for connection between the terminals includes a domain name and a subscriber name of the target terminal B 70, an IP address error or a subscriber error, for a subscriber name error.

Format definition and transmission of he request message for connection and the response message for connection between the terminals require that a conventional protocol be expanded or a new protocol be defined.

(d) Communication with IAS 322

When the service gateway B 321 receives an ATM address corresponding to a domain name of the target terminal B 70 from the DNS server 323, it should transmit a request message of the IP address allocation to the IAS 322 while receiving a response message for ID address allocation from the IAS 322.

For the purpose of this, the request message of the IP address allocation and the response message for ID address allocation are defined. The request message of the IP address allocation, which is transmitted to the IAS 322 from the service gateway 321, should include a domain name and an ATM address of the target terminal B 70. The response message for ID address allocation, which is transmitted to the service gateway 321 from the IAS 322, should include a domain name and an IP address of the target terminal B.

For reference, format definition and transmission of the request message and the response message for ID address allocation require that a conventional protocol be expanded or a new protocol be defined.

Thirdly, the IAS 322 of an ISP network should have an establishment request function for connection to the target terminal B 70. When the IAS 322 receives from the service gateway B 321 the request message of the IP address allocation to the target terminal B 70, it transmits an ATM UNI set-up message to the target terminal B 70 by-referring to the ATM address of the target terminal B 70 and establishes ATM VC along with the target terminal B 70.

After the IAS 322 establishes the ATM VC along with the target terminal B 70, it should establish a PPP session for allocation of IP address. PPP LCP for establishing the PPP session may first be initiated either the IAS 322 or the target terminal B 70.

PPP entity of the IAS 322 can allocate the IP address to the target terminal B 70 through IP Control Protocol (hereinbelow, referred to as "IPCP") by passing through a PPP Link Establishment Phase and an Authentication Phase.

After the IAS 322 allocates an IP address to the target terminal B 70, it can return the IP address of the target terminal B 70 to the service gateway B 321 through the request message of the IP address allocation. Description of the request message and the response message for ID address allocation will be omitted, because they are identical with the described in the required particulars of functions of the service gateways.

Fourthly, a dial-up terminal B 70 should have a function which receives an ATM UNI set-up message and establishes VC so as to establish ATM VC along with the IAS 322. In addition, PPP entity of the target terminal should be allocated with the IP address through the IPCP by passing through a PPP Link Establishment Phase and Authentication Phase to establish a PPP session with IAS 322.

Meanwhile, it is effective to separately construct and manage a domain of dial-up terminal such as the target terminal B 70 in addition to the required particulars of a function of network constituting elements. That is, a domain (for example, a dial-up domain) for managing exclusively a dial-up terminal is defined as a sub-domain of the ISP domain, and a domain name of a terminal is managed to have an unique property in the sub-domain. When such a sub-domain is defined, it is effective to manage the sub-domain as a separate independent DNS region.

For reference, it is noted that database of DNS 323 server of the present invention may be constructed to store data corresponding to a general telephone network including PSTN.

As can be seen from the foregoing, the present invention proposes a service providing method which includes a service providing procedure for establishing an IP level connectivity between a terminal connected to an internet and a dial-up terminal not connected to the internet while also having no inherent IP address, and some required particulars of a function for network constituting elements, thereby effectively utilizing IT, IP fax as well as a communication service between home subscriber terminals through an internet.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. An apparatus for establishing an IP level connectivity between internet access terminals using a service gateway comprising:

a first ISP network connected at one end thereof to a first terminal having an inherent IP address and at the other end thereof to an internet network, the first ISP network including a service gateway for executing authentication of a subscriber of the first terminal in accordance with a service request of the first terminal and communication with other service gateways;

a second ISP network connected at one end thereof to the internet network and at the other end thereof to an ATM network to which a second terminal having no inherent IP address is connected, the second ISP network serving to establish an IP level connectivity between the first and second terminals if the first terminal requests a connection to the internet network for service use along with the second terminal;

wherein the second ISP network comprises:

a second service gateway for requesting allocation of IP address based on whether or not there is an ATM address of the second terminal when receiving a request message for connection between the first and the second terminals from the first service gateway;

a domain name service means for transmitting an IP address and an ATM address corresponding to a domain name of the second terminal to the second service gateway by checking database when receiving a request message for IP address or ATM address allocation from the second service gateway; and an internet access means for transmitting a response message for ID address allocation to the second service gateway when receiving a request message for the IP address allocation from the second service gateway.

2. The apparatus according to claim 1, wherein the first service gateway checks the second ISP network to which a subscriber of the second terminal is joined, the second terminal being requested by the first terminal for connection therebetween, and then executes a request for connection between the first and second terminals if authentication of the subscriber of the first terminal is accepted.

3. The apparatus according to claim 2, wherein the first service gateway generates a connection request message including a domain name and a subscriber name of the second terminal upon request for connection between the first and second terminals by the first terminal, and transmits the connection request message to the second ISP network which the second terminal subscriber joined.

4. The apparatus according to claim 1, wherein the first service gateway stores mapping information of a domain name of the second ISP and an IP address of a service gateway of the second ISP to check the second ISP which the subscriber of the second terminal joined.

5. The apparatus according to claim 1, wherein the request message for ID address allocation transmitted from the second service gateway comprises a domain name and an ATM address of the second terminal.

6. The apparatus according to claim 1, wherein the second service gateway checks authentication and authority for service use of the second terminal and requests to the domain name service means allocation of an IP address corresponding to a domain name of the second terminal when receiving a request message for connection between the first and the second terminals from the first service gateway, and transmits the IP address to the first service gateway when receiving the IP address corresponding to a domain name of the second terminal from the domain name service means as a response of the request of the IP address.

7. The apparatus according to claim 1, wherein the second service gateway transmits a request message for IP address allocation to internet access means when receiving the ATM address corresponding to the domain name of the second terminal from the domain name service means as a response for the request of the ATM address, and then receives a message including the domain name and the IP address corresponding thereto as a response for the request message for the IP address allocation from the internet access means.

8. The apparatus according to claim 1, wherein the domain name service means has a record type ATMA RR for storing a pair of ATM addresses and a domain name defined in an ATM name system of ATM forum, and uses a domain name of a terminal as a terminal identifier to identify the second terminal.

9. The apparatus according to claim 1, wherein the internet access means transmits an ATM user network interface set-up message to the second terminal by referring to ATM address of the second terminal to establish an ATM virtual channel (VC) when receiving the request message for IP address allocation to the second terminal from the second service gateway, and then establish a PPP session for allocation of the IP address.

10. A method for providing an IP level connectivity between internet access terminals using a service gateway, comprising the steps of:

establishing a first service gateway for executing authentication of a subscriber of a first terminal allocated an internet IP address and for allowing the first terminal to communicate with a second terminal by a request of the first terminal;

establishing a second service gateway for executing authentication of a subscriber of the second terminal allocated with no inherent IP address and for allowing the first terminal to communicate with the second terminal by a request of the first terminal;

requesting an assignment of the inherent IP address to be allocated to the second terminal as an internet access means by means of the second service gateway; and providing an IP level connectivity between the first and second terminals by allocating an IP address to the second terminal;

wherein the step of requesting the inherent IP address comprises:

executing authentication of the subscriber of the first terminal when the connection to the second terminal is requested by the first terminal, and identifying whether or not the second terminal is a terminal which joined the second ISP network;

transmitting a request message for connection between the first and second terminals to the second service gateway if it is identified that the second terminal joined the second ISP network;

executing authentication of the subscriber of the second terminal and then transmitting a request message for IP address allocation to a domain name service means when the second service gateway receives the request message for connection between the first and second terminals from the first service gateway;

retrieving database of the domain name means and transmitting the response message for the IP address allocation retrieved to the second service gateway when the domain name service means receives the request message for IP address allocation; and transmitting a request message for IP address allocation to an internet access means when the response message includes an ATM address corresponding to a domain name of the second terminal.

11. The method according to claim 10, wherein at the step of transmitting a request message for connection, the request message transmitted to the second service gateway includes a domain name and a subscriber name of the second terminal.

12. The method according to claim 10, wherein at the step of transmitting a request message for IP address allocation, the request message transmitted to the domain name service means includes a domain name and ATM address of the second terminal.

13. The method according to claim 10, wherein at the step of retrieving database, as a result of the response message for the IP address allocation transmitted to the second service gateway, in a state in which the IP address has been allocated to the second terminal, the domain name service means transmits as the response message an IP address corresponding to a domain name of the second terminal to the second service gateway, and in a state in which the IP address has not been allocated to the second terminal, but an ATM address has been allocated thereto, the domain name service means transmits as the response message the ATM address corresponding to a domain name of the second terminal the service gateway.

14. The method according to claim 10, wherein the step of allocating the IP address, the internet access means, further comprises the steps of:

transmitting an ATM user network interface set-up message to the second terminal by referring to ATM address of the second terminal to establish an ATM virtual channel (VC) when receiving the request message for IP address allocation to the second terminal from the second service gateway; and establishing a PPP session for allocation of the IP address.

* * * * *